United States Patent
Inoue et al.

(10) Patent No.: US 6,928,356 B2
(45) Date of Patent: Aug. 9, 2005

(54) ANTISKID CONTROL SYSTEM FOR FOUR-WHEEL-DRIVE VEHICLE

(75) Inventors: Gen Inoue, Kanagawa (JP); Atsushi Ishikawa, Kawasaki (JP); Nobuyuki Ohtsu, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/210,209

(22) Filed: Aug. 2, 2002

(65) Prior Publication Data

US 2003/0028309 A1 Feb. 6, 2003

(30) Foreign Application Priority Data

Aug. 2, 2001 (JP) .......................................... 2001-235402

(51) Int. Cl.[7] .............................. B60T 7/12; G06F 7/00
(52) U.S. Cl. .............................. 701/81; 701/71; 701/79; 701/89; 303/173; 303/183; 303/186; 303/190
(58) Field of Search .............................. 701/81, 70, 71, 701/74, 78, 83, 79, 89, 90; 303/121, 125, 138, 160, 176, 189, 113.1, 113.2, 115.1, 119.1, 139, 171, 173, 183, 186, 190; 188/181, 2 R, 181 A, 181 C, 181 R

(56) References Cited

U.S. PATENT DOCUMENTS

| | | | | |
|---|---|---|---|---|
| 5,016,178 A | * | 5/1991 | Kuwana et al. ................ | 701/79 |
| 5,187,666 A | * | 2/1993 | Watanabe ...................... | 701/79 |
| 5,480,217 A | * | 1/1996 | Ohtsu .......................... | 303/167 |
| 5,634,699 A | * | 6/1997 | Ichikawa et al. ............. | 303/150 |
| 5,913,576 A | * | 6/1999 | Naito et al. .................. | 303/112 |
| 5,952,564 A | * | 9/1999 | Naito et al. ................. | 73/118.1 |
| 6,009,366 A | * | 12/1999 | Burkhard et al. .............. | 701/71 |
| 6,050,655 A | * | 4/2000 | Naito et al. .................. | 303/173 |
| 6,142,587 A | * | 11/2000 | Ohtsu et al. ................. | 303/167 |
| 6,345,869 B1 | * | 2/2002 | Matsuo et al. ............ | 303/116.1 |
| 2002/0057014 A1 | | 5/2002 | Atoche-Juarez et al. .... | 303/186 |

FOREIGN PATENT DOCUMENTS

| | | |
|---|---|---|
| DE | 195 16 120 A1 | 11/1995 |
| DE | 198 59 964 A1 | 9/2000 |
| JP | 7-277169 | 10/1995 |

* cited by examiner

Primary Examiner—Jacques H. Louis-Jacques
(74) Attorney, Agent, or Firm—Foley & Lardner LLP

(57) ABSTRACT

An antiskid control system for a four-wheel-drive vehicle is arranged to calculate a difference between an average of wheel accelerations of front wheels and an average of wheel acceleration of rear wheels. When the difference is greater than or equal to the vibration determination threshold, the antiskid control system determines that a driveline vibration is generated and executes a control for converging the driveline vibration.

8 Claims, 11 Drawing Sheets

ANTISKID CONTROL SYSTEM FOR FOUR-WHEEL-DRIVE VEHICLE

BACKGROUND OF THE INVENTION

The present invention relates to an antiskid control system which prevents sustained wheel-locking on braking, and more particularly to an antiskid control system which is arranged to converge a driveline vibration of a four-wheel-drive vehicle during antiskid control.

A four-wheel-drive vehicle tends to generate a driveline vibration corresponding to a resonance between wheel speeds of front and rear wheels when an antiskid control is executed. An earlier technology is arranged to execute a control for suppressing such driveline vibration by detecting a vibration level of a wheel acceleration of each front wheel, by determining that a driveline vibration of a four-wheel-drive vehicle is generated when the vibration level is greater than or equal to a threshold, and by prohibiting a pressure increasing control during the generation of the driveline vibration.

SUMMARY OF THE INVENTION

However, when the four-wheel-drive vehicle travels a bad road such a waved road or dirt road, the wheel acceleration fluctuates and the vibration level of the wheel acceleration temporally increases. Therefore, this earlier technology tends to erroneously determine such that this deviation of the wheel acceleration on the bad road represents the generation of the driveline vibration. This erroneous determination may produce a problem that degrades the antiskid control.

It is therefore an object of the present invention to provide an improved antiskid control system for a four-wheel-drive vehicle, which system is capable of firmly detecting the generation of a driveline vibration of the four-wheel-drive vehicle while avoiding an erroneous determination during the bad road traveling and of executing a driveline vibration convergence control only during the generation of the driveline vibration.

An aspect of the present invention resides in an antiskid control system for a four-wheel-drive vehicle, the antiskid control system comprising a master cylinder which generates a braking hydraulic pressure; a braking cylinder which is attached to each wheel of the four-wheel-drive vehicle and which generates a braking force by receiving the braking hydraulic pressure; a switch control valve which is disposed between the master cylinder and the braking cylinder and which is switched between a pressure decreasing control condition of decreasing the hydraulic pressure of the braking cylinder and a pressure increasing control condition of increasing the hydraulic pressure; a wheel speed detector which is attached to each wheel and which detects a wheel speed of each wheel and outputs a wheel speed indicative signal; and a control unit which is coupled to the switch control valve and the wheel speed detector. The control unit is arranged to calculate a target control speed on the basis of the wheel speed of each wheel, to calculate a wheel acceleration of each wheel from the wheel speed, to set the switch control valve at the pressure decreasing control condition when the wheel speed reaches the target control speed, to set the switch control valve at the pressure increasing control condition when the wheel acceleration is outside of a range from zero to a predetermined positive value after the switch control valve is set at the pressure decreasing control condition, to calculate a difference between an average of the wheel accelerations of front wheels and an average of the wheel acceleration of rear wheels, to determine that a driveline vibration is generated when the difference is greater than or equal to a vibration determination threshold, and to execute a vibration convergence control for converging the driveline vibration when the driveline vibration is generated.

Another aspect of the present invention resided in an antiskid control system for a four-wheel-drive vehicle which system executes an antiskid control of each wheel of the vehicle by controlling a switch control valve disposed between a master cylinder and a wheel cylinder of each wheel of the vehicle. The antiskid control system comprises a control unit programmed to detect a wheel speed of each wheel, to calculate a target control speed on the basis of the wheel speed of each wheel, to calculate a wheel acceleration of each wheel from the wheel speed, to command the switch control valve to execute a pressure decreasing control of decreasing a hydraulic pressure of the wheel cylinder when the wheel speed reaches the target control speed, to command the switch control valve to execute a pressure increasing control of increasing the hydraulic pressure of the wheel cylinder when the wheel acceleration is smaller than zero or greater than a predetermined positive value after the pressure decreasing control is executed, to calculate a difference between an average of the wheel accelerations of front wheels and an average of the wheel acceleration of rear wheels, to determine that a driveline vibration is generated when the acceleration difference is greater than or equal to the vibration determination threshold, and to execute a control for converging the driveline vibration when the driveline vibration is generated.

The other objects and features of this invention will become understood from the following description with reference to the accompanying drawings.

DETAILED DESCRIPTION OF THE INVENTION

Referring to FIGS. 1 through 11, there is shown an embodiment of an antiskid control system for a four-wheel-drive vehicle according to the present invention.

Figure 1:
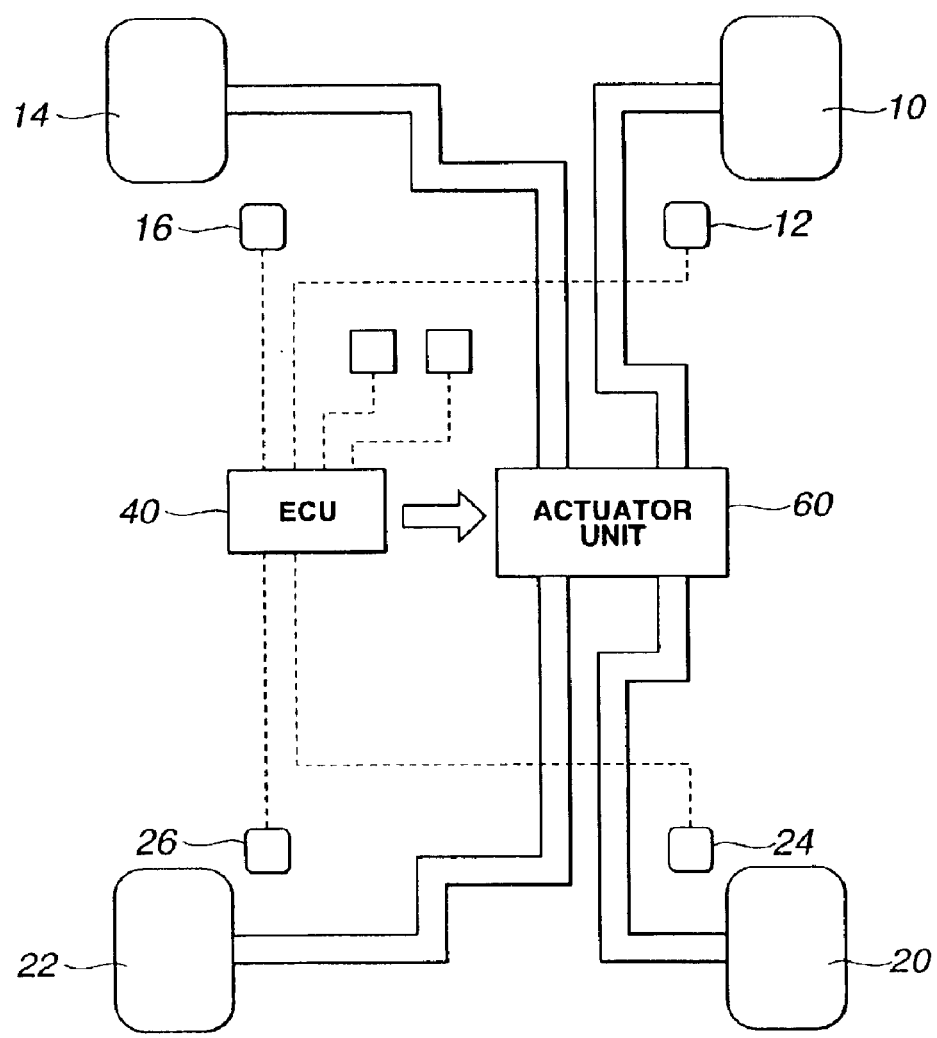
FIG. 1 is a schematic view showing an antiskid control system for a four-wheel-drive vehicle according to an embodiment of the present invention.

As shown in FIG. 1, the antiskid control system is installed in the four-wheel-drive vehicle and comprises wheel speed sensors 12 and 16 which respectively outputs wheel speed indicative signals according to the rotations of a right-front wheel 10 and a left-front wheel 14 functioning as steered wheels, and rear wheel speed sensors 24 and 26 which respectively generates wheel speed indicative signals according to the rotation of a right-rear wheel 20 and a left-rear wheel 22 functioning as driving wheels. These sensors 12, 16, 24 and 26 are coupled to an electronic control unit (ECU) 40 including a microcomputer (CPU).

Figure 2:
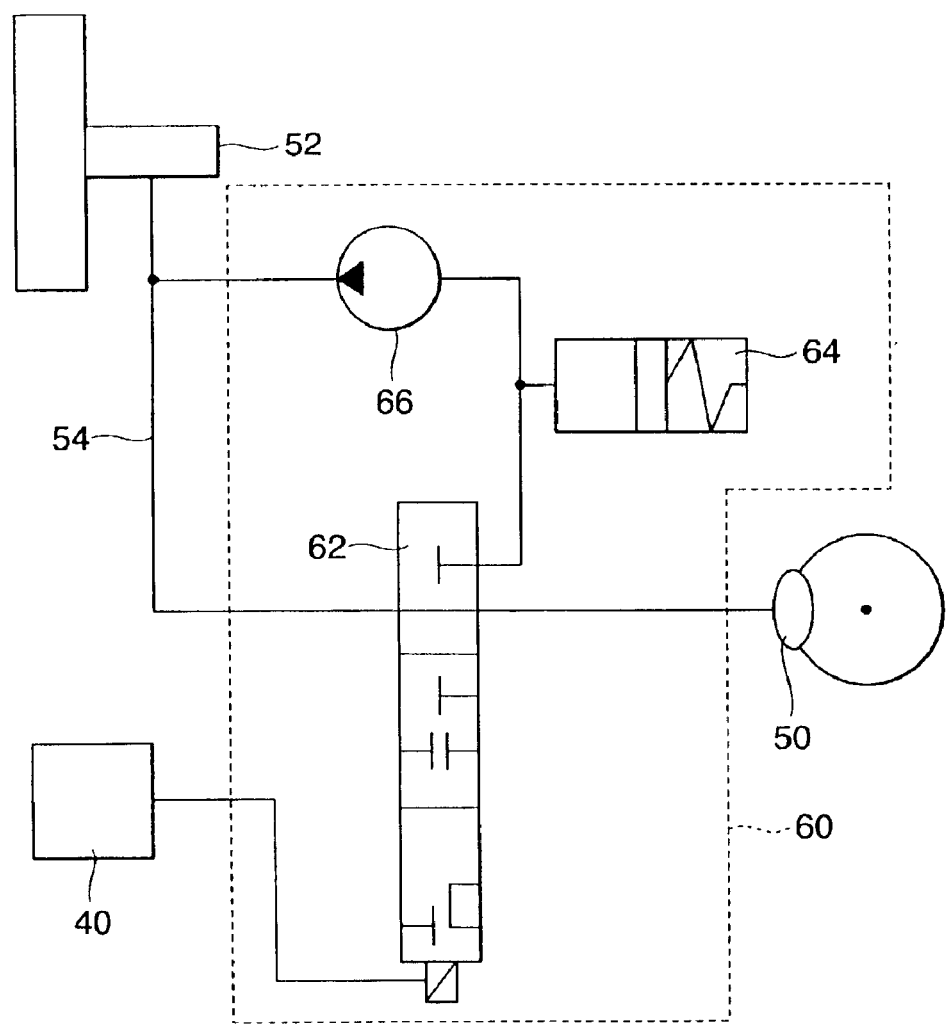
FIG. 2 is a schematic circuit view showing a brake hydraulic circuit of the antiskid control system of FIG. 1.

As shown in FIG. 2, a brake unit for each wheel comprises a wheel cylinder (braking cylinder) 50 fluidly coupled to a master cylinder 52 through a main hydraulic passage 54. Master cylinder 52 generates a brake hydraulic pressure in response to a depression of a brake pedal depressed by a driver. An actuator unit 60 for controlling a hydraulic pressure of each wheel 10, 14, 20, 22 is disposed in main hydraulic passage 54. Although one line brake hydraulic circuit and a wheel are shown in FIG. 2, two lines of brake hydraulic circuits are coupled to the master cylinder 52. One of the brake hydraulic circuits is coupled to wheel cylinders 50 and 50 of front-right wheel 10 and rear-left wheel 22, and the other of the brake hydraulic circuits is coupled to wheel cylinders 50 and 50 of front-left wheel 14 and rear-right wheel 20.

Actuator unit 60 comprises switch control valves 62 functioning as switching control means, reservoirs 64, and a hydraulic pump 66. Each switch control valve 62 for each wheel changes an operation state of the antiskid control system between a pressure increasing control and a pressure decreasing control of a hydraulic pressure in each wheel cylinder 50 of each disc brake set. Each reservoir 64 stores brake fluid of wheel cylinders 50 when wheel cylinder 50 is put in the pressure decreasing control condition. Reservoir 64 is provided in each brake hydraulic circuit of two lines. Hydraulic pump 66 returns the brake fluid stored in reservoir 64 to main passage 54.

Subsequently, the antiskid control process executed by ECU 40 will be discussed with reference to a flowchart of FIG. 3.

At step S1, ECU 40 calculates four wheel speeds VW of front-right, front-left, rear-right and rear-left wheels 10, 14, 20 and 22 according to the outputs of wheel speed sensors 12, 16, 24 and 26. Further, ECU 40 calculates each wheel acceleration VWD by differentiating each wheel speed VW.

At step S2, ECU 40 calculates a pseudo vehicle-body speed (pseudo-speed) VI from wheel speed VW calculated at step S1. The detail of this calculation of pseudo-speed VI will be discussed later with reference to flowcharts of FIGS. 4 and 5.

At step S3, ECU 40 executes detecting operations of a driveline vibration and a bad road. The driveline vibration represents a condition that a tensional force is generated between the front and rear shafts due to the construction of a four-wheel-drive vehicle wherein a shaft of front wheels is connected to a shaft of rear wheels through a center differential. A resonance is occurred between the wheel speeds of front and rear wheels with a half cycle shifted. Further, a bad road is a condition of a road surface which occurs small vibrations due to a waved surface or dirt road. The process for detecting the driveline vibration and the bad road will be discussed later with reference to a flowchart of FIG. 6.

At step S4, ECU 40 calculates a target control speed (pressure decreasing control threshold) VWS from pseudo-speed VI calculated at step S2. This calculation process of target control speed VWS will be discussed later with reference to a flowchart of FIG. 7.

At step S5, ECU 40 executes a PI (proportional plus integral) control calculation process. More specifically, ECU 40 executes the calculation of target pressure increasing/decreasing pulse time PB indicative of a pressure increasing/decreasing control time of a target brake hydraulic pressure. The detailed content of the PI control calculation process will be discussed later with reference to a flowchart of FIG. 8.

At step S6, ECU 40 determines whether a driveline vibration determination flag FDTVIB is set at 1 or not. When the determination at step S6 is negative (FDTVIB=0), ECU 40 determines that no driveline vibration occurs, and therefore the routine proceeds from step S6 to step S7.

At step S7, ECU 40 determines whether wheel speeds VW calculated at step S1 is lower than target control speed VWS or not, and whether a pressure-increasing-control execution flag ZFLAG indicative that the pressure increasing control is being executed is set at 1 or not. When the determination at step S7 is affirmative, that is, when VW<VWS and ZFLAG=1, ECU 40 determines that it is necessary to execute the pressure decreasing control. Therefore, the routine proceeds to step S9.

At step S9 subsequent to the affirmative determination at step S7, ECU 40 sets a pressure-decreasing control execution time AS at a predetermined time A (AS=A ms), resets a pressure holding control time THOJI at zero (THOJI=0), and sets the pressure-decreasing execution flag GFLAG at 1 (GFLAG=1).

At step S11 subsequent to the execution of step S9, ECU 40 executes the pressure decreasing control of the brake hydraulic. More specifically, ECU 40 outputs a switching signal to switch control valve 62 of actuator unit 60 so as to fluidly communicate master cylinder 52, wheel cylinder 50 and reservoir 64. The detailed content of the pressure decreasing control executed at step S11 will be discussed later with reference to a flowchart of FIG. 9.

At step S12 subsequent to the execution of step S11, ECU 40 increments a content SGENCNT of a vibration pressure-decreasing counter. Thereafter, the routine proceeds to step S22.

When the determination at step S6 is affirmative (FDTVIB=1), ECU 40 determines that the driveline signal is being generated, and therefore the routine proceeds to step S10. At step S10, ECU 40 determines whether or not the content SGENCNT of the vibration pressure-decreasing counter is greater than a vibration pressure-decreasing count threshold #SGEN. When the determination at step S10 is affirmative (SGENCNT>#SGEN), the routine proceeds to step S7. When the determination at step S10 is negative (SGENCNT≦#SGEN), the routine proceeds to step S11 wherein ECU 40 executes the pressure decreasing control.

When the determination at step S7 is negative (VW≧VWS or ZFLAG=0), the routine proceeds to step S8.

At step S8, ECU 40 executes a first determination as to whether it is necessary to execute the brake hydraulic pressure decreasing control. More specifically, ECU 40 determines whether a pressure holding control time THOJI is greater than a predetermined time B millisecond and whether a value (PB−DECT) obtained by subtracting a pressure decreasing timer DECT from a target pressure increasing/decreasing pulse time PB is greater than a predetermined time $T_1$ ms (millisecond). ECU 40 further executes a second determination as to whether the hold control time THOJI is greater than a predetermined time C millisecond and whether the value (PB−DECT) obtained by subtracting the pressure decreasing timer DECT from the target pressure increasing/decreasing pulse time PB is greater than a predetermined time $T_2$ millisecond which is smaller than T1 millisecond.

When the determination at step S8 is affirmative, that is, when at least one of the first and second determinations at step S8 is affirmative (THOJI>B∩PB−DECT>$T_1$ or THOJI>C∩PB−DECT>$T_2$), it is necessary to execute the pressure decreasing control, and therefore the routine proceeds to step S9. When the determination at step S8 is negative, that is, when both of the first and second determinations are negative, the routine proceeds to step S13.

At step S13, ECU 40 determines whether a small-vibration determination flag FDTVIB2 is set at 1 or not. When the determination at step S13 is affirmative (FDTVIB2=1), ECU 40 determines that the four-wheel-drive vehicle is traveling a bad road on which small vibrations are generated. Therefore, the routine proceeds from step S13 to step S20 wherein ECU 40 increments pressure-holding-control time THOJI. Then, the routine proceeds to step S21 wherein ECU 40 executes the pressure holding control of brake hydraulic pressure.

When the determination at step S13 is negative (FDTVIB2=0), ECU 40 determines that no small vibration is generated. Therefore, the routine proceeds to step S14 in order to determine the necessity of the pressure increasing control or the pressure holding control of the brake hydraulic. More specifically, at step S14 ECU 40 determines whether or not a value (PB−INCT) obtained by subtracting pressure-increasing-control time INCT from target pressure increasing/decreasing pulse time PB is smaller than a predetermined time −$T_1$ millisecond and whether or not pressure-holding-control time THOJI is greater than a predetermined time C millisecond. When the determination at step S14 is affirmative (PB−INCT<−$T_1$∩THOJI>C), ECU 40 determines that no wheel slip occurs. Therefore, the routine proceeds to step S15.

At step S15, ECU 40 determines whether a pressure-decreasing execution flag GFLAG, which is indicative that the pressure decreasing control is being executed, is set at 1 or not and whether wheel acceleration VWD is greater than 0 g or not. When the determination at step S15 is negative, that is, when at least one of the above determinations is negative, ECU 40 determines that it is necessary to increase the hydraulic pressure of wheel cylinder 50. Therefore, the routine proceeds to step S16 wherein pressure-holding-control time THOJI is reset (THOJI=0). Then, the routine proceeds to step S17 in order to execute the pressure increasing control of the brake hydraulic pressure.

At step S17, ECU 40 executes the pressure increasing control. More specifically, switch control valve 62 of actuator unit 60 is driven to the pressure increasing control condition so that master cylinder 52 is fluidly communicated with wheel cylinder 50. The detailed process of the pressure increasing control will be discussed later with reference to a flowchart of FIG. 10.

At step S18, ECU 40 resets vibration pressure-decreasing counter (SGENCNT=0).

At step S19, ECU 40 sets pressure-increasing-control execution flag ZFLAG at 1 (ZFLAG=1). Then, the routine proceeds to step S22.

When the determination at step S14 is negative (PB−INCT≧−T or THOJI≦C), or when the determination at step S15 is affirmative (GFLA=1 and VW>0 g), the routine proceeds to step S20 wherein ECU 40 increments pressure-holding-control time THOJI. Then the routine proceeds to step S21 in order to execute the pressure-increasing-control prohibiting control.

At step S21, ECU executes the pressure holding control of the brake hydraulic pressure. That is, in this case, switch control valve 62 is set at a position where wheel cylinder 50 is fluidly disconnected from master cylinder 52 and reservoir 64.

At step S22 subsequent to the execution of step S12, S19 or step S21, ECU 40 determines whether a time period of 10 milliseconds has elapsed from the start of the present routine or not. The determination at step S22 is repeatedly executed until the determination at step S22 becomes affirmative. When the determination at step S22 is affirmative, that is, 10 milliseconds has elapsed, the routine proceeds to step S23 wherein ECU 40 decrements pressure-decreasing-control execution time AS, and the routine returns to step S1 to terminate the present routine and to start the next routine.

Next, with reference to the flowchart of FIG. 4, the pseudo-speed calculation process of step S2 in FIG. 3 will be discussed.

At step S201, ECU 40 sets a select-high wheel speed VFS at a maximum value of wheel speeds VW of four wheels (VFS=maximum of VW of four wheels).

At step S202, ECU 40 determines whether or not pressure-decreasing control execution time AS is set at 0 in order to check that the pressure decreasing control is not being executed. When the determination at step S202 is affirmative (AS=0), the routine proceeds to step S203 wherein ECU 40 sets select-high wheel speed VFS at a maximum value in wheel speeds VW of driven wheels. Thereafter, the routine proceeds to step S204. When the determination at step S202 is negative, the routine directly proceeds to step S204.

At step S204, ECU 40 determines whether or not pseudo-speed VI is higher than or equal to select-high wheel speed VFS. When the determination at step S204 is affirmative (VI≧VFS), the routine proceeds to step S205 wherein pseudo-speed VI during the vehicle deceleration is calculated from the following expression (1):

$$VI=VI-VIK\times k, \quad (1)$$

where VIK is a vehicle-body deceleration. The detailed process of calculating vehicle-body deceleration VIK will be discussed later with reference to a flowchart of FIG. 5.

Figure 3:
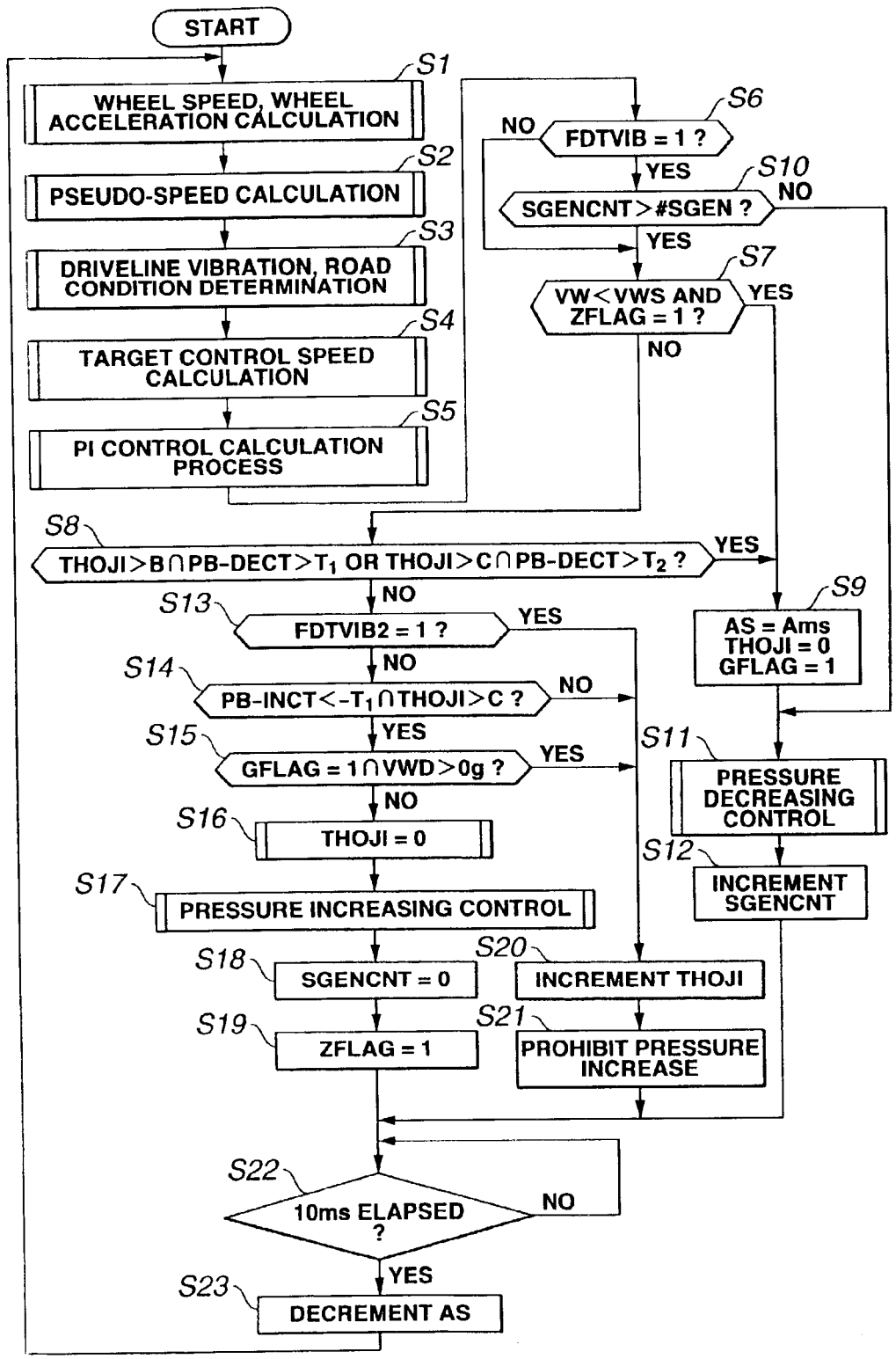
FIG. 3 is a flowchart showing a basic control content executed by an ECU of the antiskid control system of FIG. 1.
Figure 4:
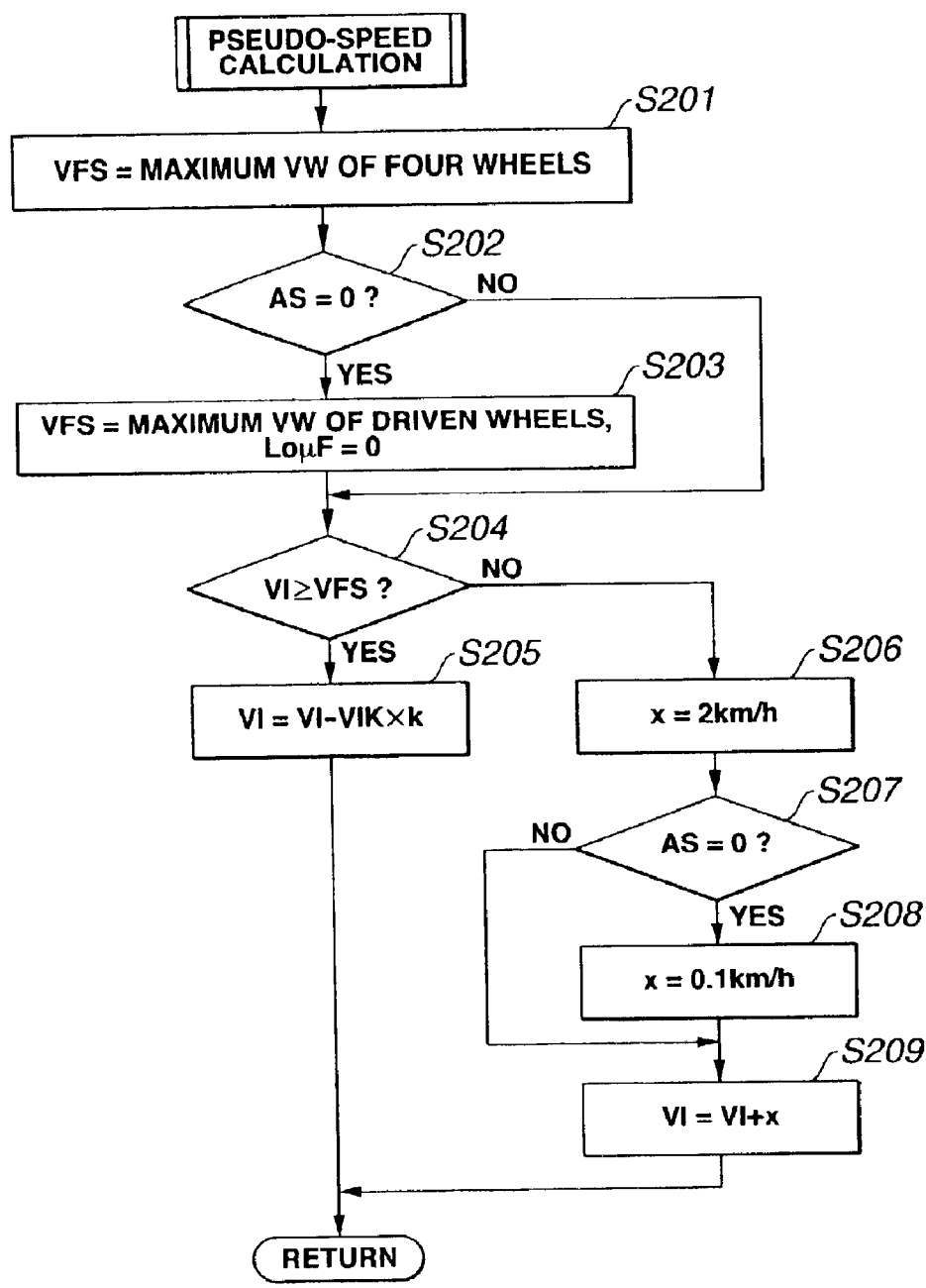
FIG. 4 is a flowchart showing a pseudo-speed calculation process which is of a sub-routine of the flowchart of FIG. 3.

After the execution of step S205, the subroutine of the pseudo-speed calculation is once terminated and returns to the main routine of FIG. 3.

When the determination at step S204 is negative (VI<VFS), ECU 40 determines that the vehicle is being accelerated, and therefore the routine proceeds to step S206 wherein a deceleration limiter constant x is set at 2 km/h (x=2 km/h). Then, the routine proceeds to step S207.

At step S207, ECU 40 determines whether or not pressure-decreasing-control execution time AS is set at 0 in order to check that the pressure decreasing control is not being executed. When the determination at step S207 is affirmative (AS=0), the routine proceeds to step S208 wherein deceleration limiter constant x is set at 0.1 km/h (x=0.1 km/h). Then the routine proceeds to step S209. When the determination at step S207 is negative (As≠0), the routine directly proceeds to step S209.

At step S209, ECU 40 calculates pseudo-speed VI from the following expression (2):

$$VI=VI+x. \qquad (2)$$

Then, the present subroutine is terminated and the routine returns to the main routine of FIG. 3.

Figure 5:
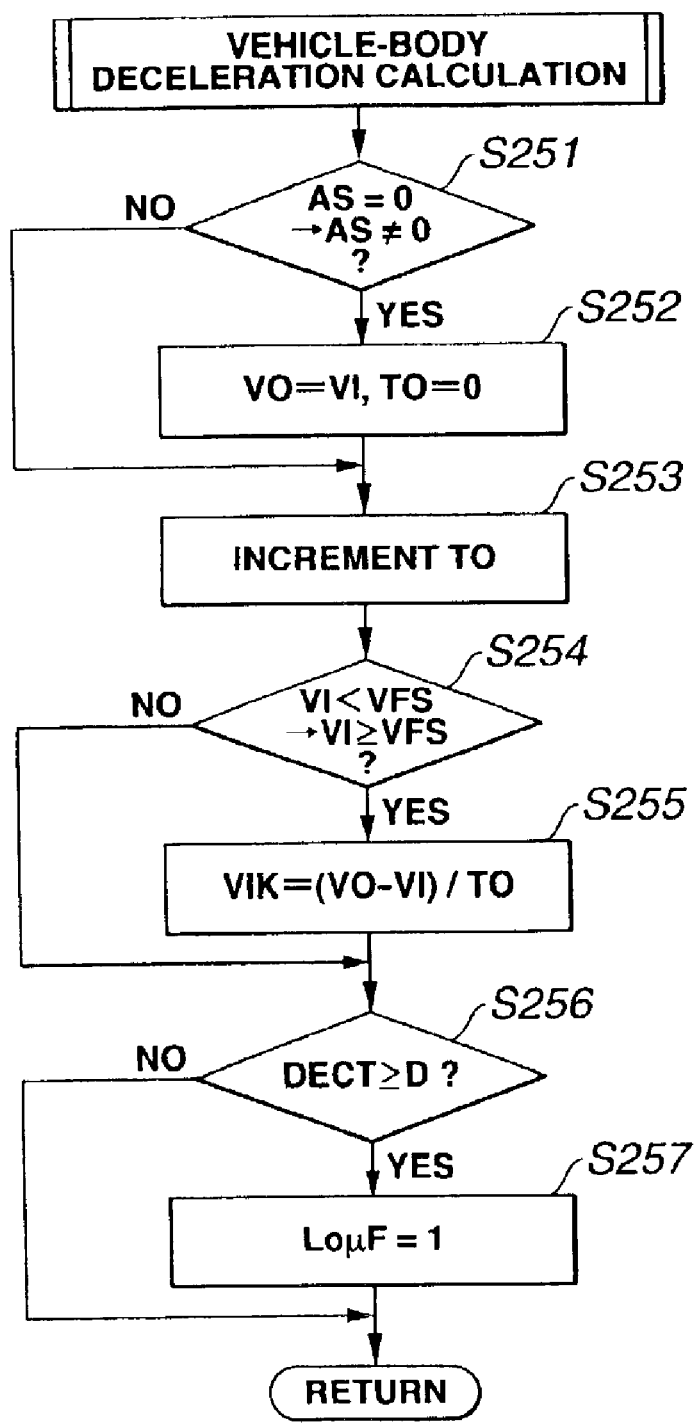
FIG. 5 is a flowchart showing a vehicle deceleration calculation process which is of a sub-routine of the flowchart of FIG. 3.

Subsequently, the vehicle-body deceleration calculation process employed at step S205 of FIG. 4 will be discussed in detail with reference to the flowchart of FIG. 5.

At step S251, ECU 40 determines whether or not a pressure control condition is changed from a non-pressure-decreasing-control condition (AS=0) to the pressure decreasing control condition (AS≠1). When the determination at step S251 is affirmative, the routine proceeds to step S252 wherein a pressure-decreasing-control starting vehicle speed VO, which is a vehicle speed at a moment that the pressure decreasing control is first executed, is set at pseudo-speed VI (VO=VI), and a vehicle deceleration timer TO is reset at zero (TO=0). Then, the routine proceeds to step S253. When the determination at step S251 is negative, the routine directly proceeds to step S253.

At step S253, ECU 40 increments vehicle deceleration timer TO.

At step S254 subsequent to the execution of step S253, ECU 40 executes a spin-up determination. More specifically, ECU 40 determines whether select-high wheel speed VFS recovers to pseudo-speed VI or not. When the determination at step S254 is affirmative (VI<VFS→VI≧VFS), the routine proceeds to step S255 wherein ECU 40 calculates vehicle-body deceleration VKI from the following expression (3):

$$VIK=(VO-VI)/TO. \qquad (3)$$

When the determination at step S254 is negative, (VI<VFS), the routine jumps to step S256.

At step S256, ECU 40 executes a low-$\mu$ road determination for determining whether a traveling road has a low friction surface or not. More specifically, ECU 40 determines whether or not the traveling road is a low-$\mu$ road, by determining whether or not the pressure decreasing time DECT is greater than or equal to D millisecond. When the determination at step S256 is affirmative (DECT≧D), the routine proceeds to step S257 wherein ECU 40 sets a low-$\mu$ flag Lo$\mu$F at 1 (Lo$\mu$F=1). Then, the present subroutine is terminated and the routine returns to the flowchart of FIG. 4.

Subsequently, with reference to the flowchart of FIG. 6, the detecting process for detecting driveline vibration and bad-road condition, which is executed at step S3 in FIG. 3 will be discussed in detail.

At step S301, ECU 40 calculates a front average VWDFA of wheel accelerations VWDFL and VWDFR of front right and left wheels 10 and 14 (VWDFA=(VWEFR+VWDFL)/2).

At step S302, ECU 40 calculates a rear average VWDRA of wheel accelerations VWDRR and VWDRL of rear right and left wheels 20 and 22 (VWDRA=(VWERR+VWDRL)/2).

At step S303, ECU 40 calculates an absolute value of a difference between front average VWDFA and rear average VWDRA as an acceleration difference DVWD_FR (DVWD_FR=|VWDFA−VWDRA|).

At step S304, ECU 40 decrements a count CDVWD1 of a large-vibration cycle counter and a count CDVWD2 of a small-vibration cycle counter.

At step S305, ECU 40 determines whether or not the acceleration difference DVWD_FR is greater than a vibration starting threshold DVWDVIB#. When the determination at step S305 is affirmative (DVWD_FR>DVWDVIB#), the routine proceeds to step S306.

At step S306, ECU 40 determines whether the count CDVWD1 of the large-vibration cycle counter is greater than a large-vibration cycle threshold SVBCNT1# or not. When the determination at step S306 is affirmative (CDVWD1>SVBCNT1#), the routine proceeds to step S307 wherein driveline vibration determination flag FDTVIB is set at 1 (FDTVIB=1). Thereafter, the routine proceeds to step S308. When the determination at step S306 is negative (CDVWD1≦SVBCNT#), the routine directly proceeds to step S308.

At step S308, ECU 40 sets count CDVWD1 of large-vibration cycle counter at 20 (CDVWD1=20). Then, the routine proceeds to step S311.

When the determination at step S305 is negative (DVWD_FR≦DVWDVIV#), the routine proceeds to step S309 in order to determine the deviation of the large vibration.

At step S309, ECU 40 determines whether or not the acceleration difference DVWD_FR is greater than a vibration terminating threshold DVWDCLR#. When the determination at step S309 is negative (DVWD_FR≦DVWDVIB#), it is determined that the large vibration is converged. Therefore, the routine proceeds to step S311. When the determination at step S309 is affirmative (DVWD_FR>DVWDVIB#), it is determined that the large vibration is continuing, and therefore the routine proceeds to step S310.

At step S310, ECU 40 determines whether or not count CDVWD1 of large-vibration cycle counter is not reset at zero. When the determination at step S310 is affirmative (CDVWD1≠0), the routine proceeds to step S308 wherein count CDVWD1 of the large-vibration cycle counter is set at 20 (CDVWD1=20). Thereafter, the routine proceeds to step S311. When the determination at step S310 is negative (CDVWD1=0), the routine directly proceeds to step S311.

At step S311, ECU 40 determines whether or not count CDVWD1 of the large-vibration cycle counter is smaller than or equal to the large-vibration cycle threshold SVBCNT1#. When the determination at step S311 is affirmative (CDVWD1≦SVBCNT1#), that is, when it is determined that the large-vibration is converged, the routine proceeds to step S312 wherein driveline vibration determination flag FDTVIB is reset at zero (FDTVIB=0). Thereafter, the routine proceeds to step S313. When the determination at step S311 is negative (CDVWD1>SVBCNT#), that is, when it is determined that the large vibration is yet continuing (is not converged), the routine directly proceeds to step S313.

At step S313, ECU 40 determines whether or not acceleration-difference absolute value DVWD_FR is greater than a small-vibration determination threshold DVWDVIB2#. When the determination at step S313 is affirmative (DVWD_FR>DVWDVIB2#), it is determined that there is a possibility that the small vibration is being generated. Therefore, the routine proceeds to step S314 wherein a count CDVWD2 of the small-vibration cycle counter set at 20 (CDVWD2=20). Thereafter, the routine proceeds to step S318. When the determination at step S313 is negative (DVWD_FR≦DVWDVIB2#), ECU 40 determines that no small vibration is generated. Therefore, the routine proceeds to step S315.

At step S315, ECU 40 determines whether or not count CDVWD2 of the small-vibration cycle counter is greater than a small-vibration cycle threshold SVBCNT2#. When the determination at step S315 is affirmative (CDVWD2>SVBCNT2#), the routine proceeds to step S316 wherein a count CSDTVIB2 of small-vibration cycle counter is incremented. Thereafter, the routine proceeds to step S318. When the determination at step S315 is negative (CDVWD2≦SVBCNT2#), the routine proceeds to step S317 wherein count CSDTVIB2 of the small-vibration cycle counter is cleared. Thereafter, the routine proceeds to step S318.

At step S318, ECU 40 determines whether or not count CSDTVIB2 of the small-vibration cycle counter is greater than a small-vibration determination threshold SCSVIB#. When the determination at step S318 is affirmative (CSDTVIB2>SCSVIB#), ECU 40 determines that small-vibration is being generated. Therefore, the routine proceeds to step S319 wherein small-vibration determination flag FDTVIB2 is set at 1 (FDTVIB2=1). Thereafter, the routine proceeds to step S320. When the determination at step S318 is negative (CSDTVIB2≦SCSVIB#), the routine directly proceeds to step S320.

At step S320, ECU 40 determines whether or not count CSDTVIB2 of the small-vibration cycle counter is reset at zero. When the determination at step S320 is affirmative (CSDTVIB2=0), ECU 40 determines that small vibration is converged, and therefore the routine proceeds to step S321 wherein small-vibration determination flag FDTVIB2 is reset at zero (FDTVIB2=0). Then, the present routine is terminated. When the determination at step S320 is negative (CSDTVIB2≠0), ECU 40 determines that no small vibration is generated and therefore the routine directly proceeds to the return block to terminate the present routine.

Figure 7:
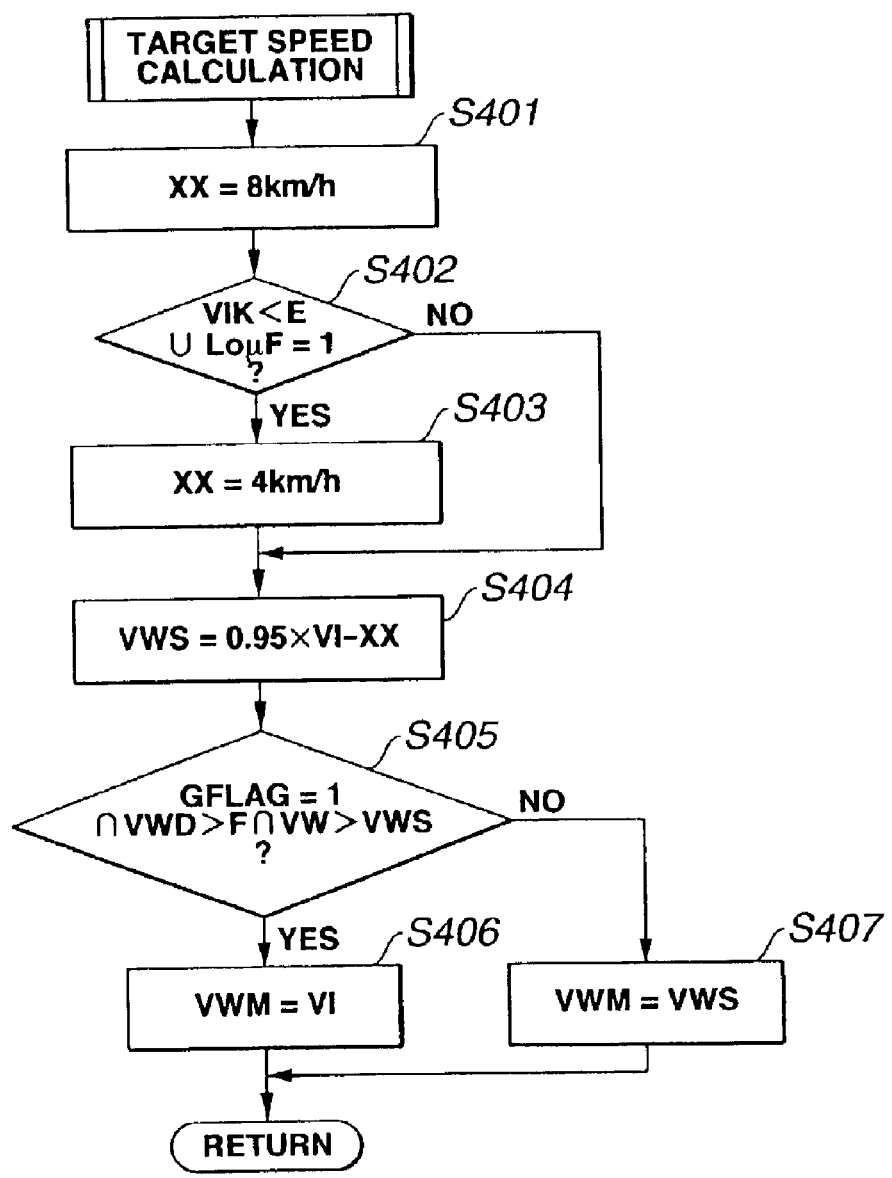
FIG. 7 is a flowchart showing a target vehicle speed calculation process which is of a sub-routine of the flowchart of FIG. 3.

Subsequently, the target control speed calculation process executed at step S4 of FIG. 3 is discussed in detail with reference to the flowchart of FIG. 7.

At step S401, ECU 40 sets an offset value XX of target control speed VWS at 8 km/h.

At step S402, ECU 40 determines whether or not the vehicle is traveling on a low-$\mu$ road, by determining whether vehicle-body deceleration VIK is smaller than a predetermined value E and whether or not low-$\mu$ flag Lo$\mu$F is set at 1. When the determination at step S402 is affirmative (VIK<E and Lo$\mu$F=1), that is, when ECU 40 determines that the vehicle is traveling a low-$\mu$ road, the routine proceeds to step S403 wherein offset value XX is set at 4 km/h. Thereafter, the routine proceeds to step S404. When the determination at step S402 is negative (VIK≧E or Lo$\mu$F≠1), ECU 40 determines that the vehicle is traveling on a high-$\mu$ road, and therefore the routine directly proceeds to step S404.

Figure 6:
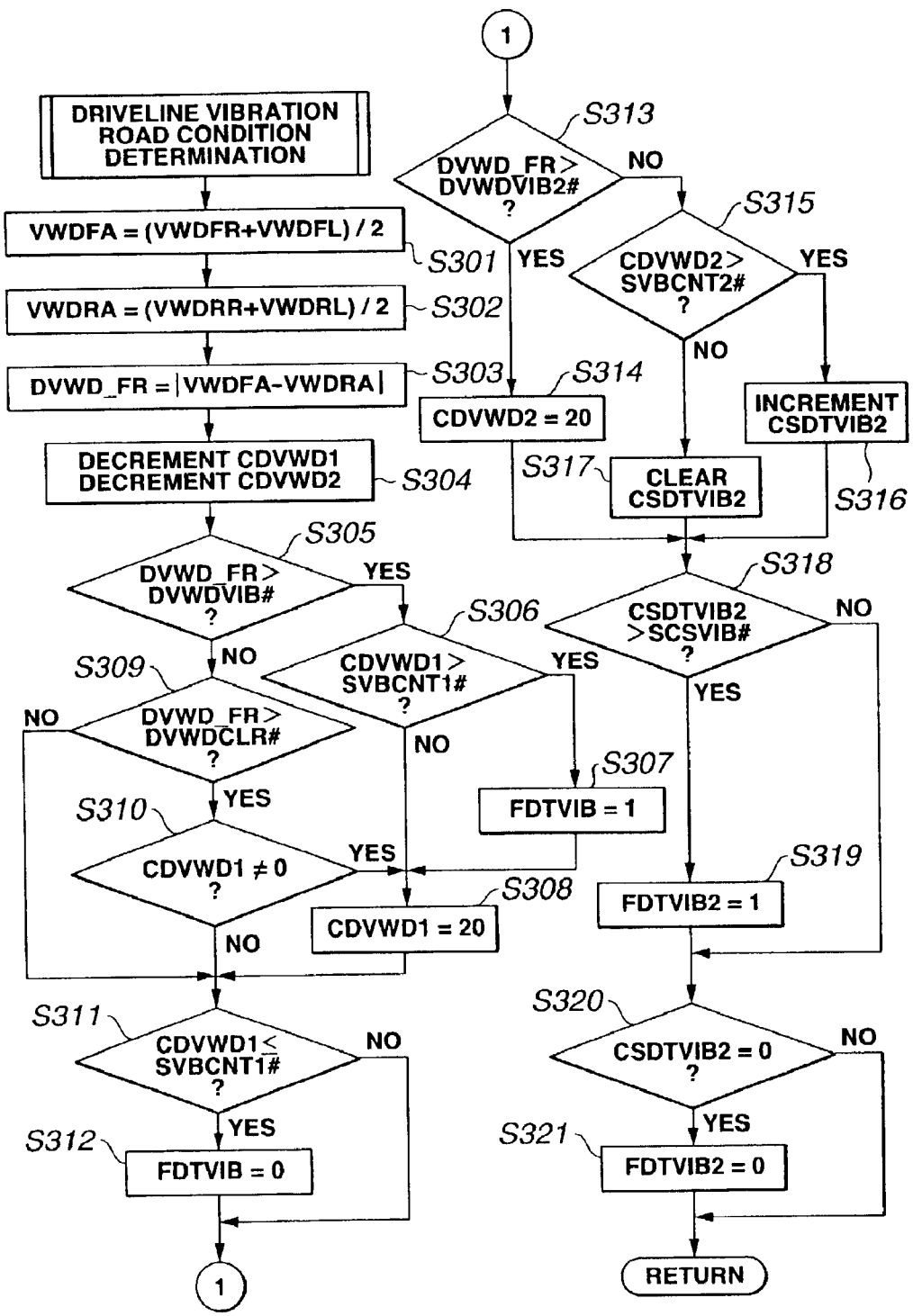
FIG. 6 is a flowchart showing a driveline vibration and road condition determining process which is of a sub-routine of the flowchart of FIG. 3.

At step S404, ECU 40 calculates target control speed VWS on the basis of pseudo-speed VI, offset value XX, right and left $\mu$ split determination and control content of FIG. 6 and the following expression (4):

$$VWS=0.95 \times VI-XX \quad (4)$$

At step S405 subsequent to the calculation at step S404, ECU 40 determines whether or not pressure-decreasing-control execution flag GFLAG is set at 1, and whether or not wheel acceleration VWD is greater than a predetermined value F, and whether or not wheel speed VW is greater than target control speed VWS. When the determination at step S405 is affirmative (GFLAG=1 and VWD>F and VW>VWS), the routine proceeds to step S406 wherein target slip speed VWM is set at pseudo-speed VI (VWM= VI). When the determination at step S405 is negative (GFLAG≠1 or VWD≦F or VW≦VWS), the routine proceeds to step S407 wherein target slip speed VWM is set at target control speed VWS (VWM=VWS). After the execution of step S406 or S407, the routine proceeds to a return block to terminate the present routine and to return to the flowchart of FIG. 3.

Figure 8:
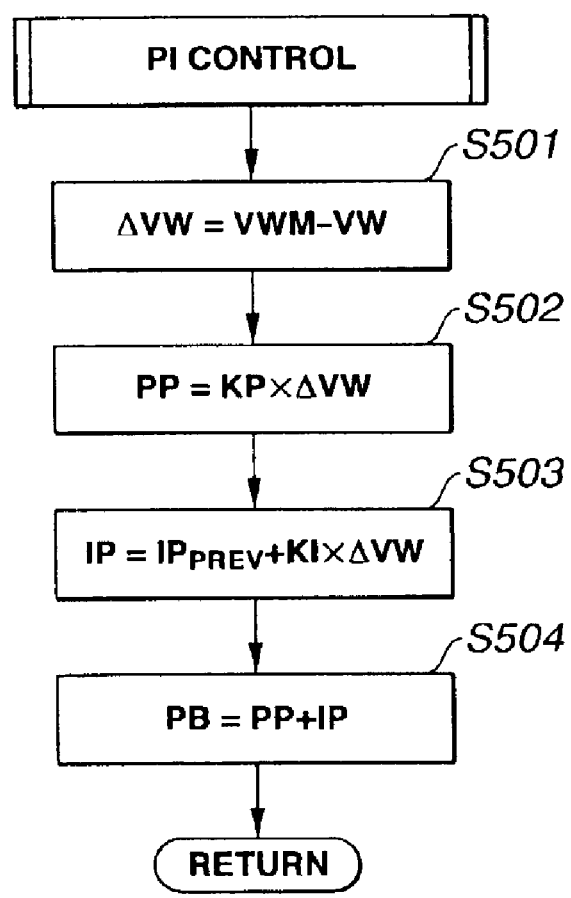
FIG. 8 is a flowchart showing a PI control calculation process which is of a sub-routine of the flowchart of FIG. 3.

Subsequently, the PI control process executed at step S5 of FIG. 3 will be discussed in detail with reference to the flowchart of FIG. 8.

At step S501, ECU 40 calculates a difference ΔVW from the following expression (5):

$$\Delta VW=VWM-VW. \quad (5)$$

At step S502, ECU 40 calculates a proportional part PP of the PI control from the following expression (6):

$$PP=KP \times \Delta VW, \quad (6)$$

where KP is a proportional gain.

At step S503, ECU 40 calculates an integral part IP of the PI control from the following expression (7):

$$IP=IP_{PREV}+KI \times \Delta VW, \quad (7)$$

where $IP_{PREV}$ is IP at a time 10 ms before, and KI is an integral gain.

At step S504, ECU 40 calculates a target pressure increasing/decreasing pulse time PB from the following expression (8):

$$PB=PP+IP. \quad (8)$$

Thereafter, the routine proceeds to a return block to terminate a present routine and to return to the main routine of FIG. 3.

Subsequently, the pressure decreasing control process executed at step S11 of FIG. 3 will be discussed in detail with reference to the flowchart of FIG. 9.

At step S601, ECU 40 resets pressure increasing time counter INCT (INCT=0).

At step S602, ECU 40 sets pressure decreasing pulse time GAW at target pressure increasing/decreasing pulse time PB.

At step S603 subsequent to the execution of step S602, ECU 40 determines whether or not pressure-increasing-control execution flag ZFLAG is set at 1. When the determination at step S603 is affirmative (ZFLAG=1), the routine proceeds to step S604 wherein ECU 40 calculates pressure decreasing pulse time GAW from the following expression (9):

$$GAW=VWD \times \alpha/VIK, \quad (9)$$

where α is a coefficient.

Further at step S604, ECU 40 resets pressure-increasing-control execution flag ZFLAG at zero (ZFLAG=0). Thereafter, the routine proceed to step S605.

When the determination at step S603 is negative (ZFLAG≠0), the routine directly jumps to step S605.

At step S605, ECU 40 executes a process of outputting a signal for decreasing the brake hydraulic pressure and increments pressure decreasing time DECT. Thereafter, the routine proceeds to step S606.

At step S606, ECU 40 determines whether or not pressure decreasing time DECT is greater than or equal to pressure decreasing pulse time GAW, or whether or not wheel acceleration VWD is greater than a predetermined value F. When the determination at step S606 is affirmative (DECT>GAW or VWD>F), the routine proceeds to step S607 wherein ECU

40 executes a process of outputting a signal for holding the brake hydraulic pressure and decrements pressure decreasing time timer DECT. Thereafter, the present routine is terminated. When the determination at step S606 is negative (DECT<GAW and VWD≦F), the routine directly proceeds to a return block to terminate the present routine.

Figure 10:
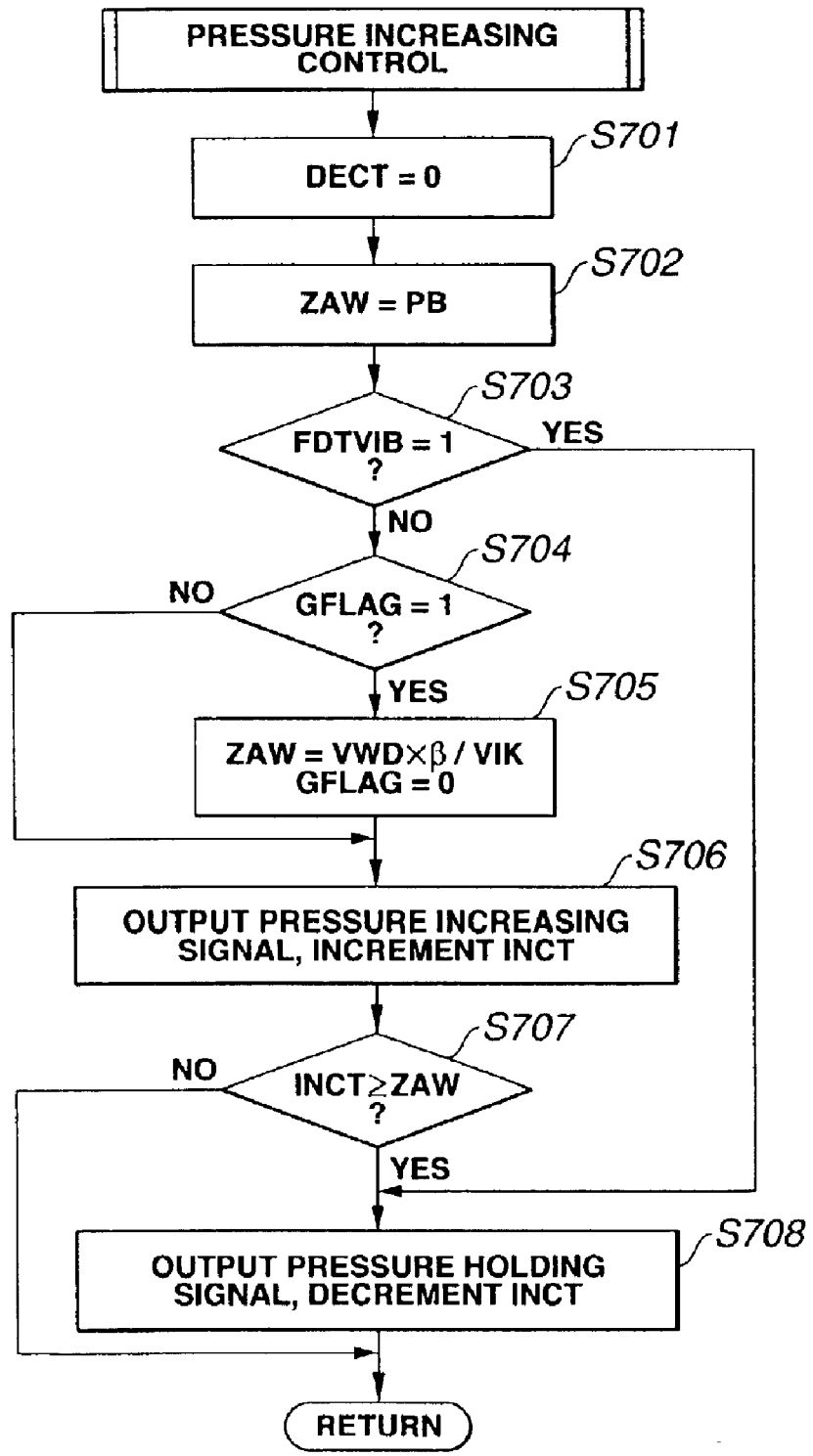
FIG. 10 is a flowchart showing a pressure decreasing control process which is of a sub-routine of the flowchart of FIG. 3.

Subsequently, the pressure increasing control process executed at step S17 of FIG. 3 is discussed in detail with reference to a flowchart of FIG. 10.

At step S701, ECU 40 resets pressure decreasing time counter DECT (DECT=0).

At step S702, ECU 40 sets pressure increasing pulse time ZAW at target pressure increasing/decreasing pulse time PB. Thereafter, the routine proceeds to step S703.

At step S703, ECU 40 determines whether or not driveline vibration determination flag FDTVIB is set at 1. When the determination at step S703 is negative (FDTVIB=0), the routine proceeds to step S704.

At step S704, ECU 40 determines whether or not pressure-decreasing execution flag GFLAG is set at 1. When the determination at step S704 is affirmative (GFLAG=1), the routine proceeds to step S705 wherein ECU 40 calculates pressure decreasing pulse time GAW from the following expression (10):

$$GAW = VWD \times \beta \times VIK, \quad (10)$$

where β is a coefficient. Further at step S705, ECU 40 resets pressure-decreasing execution flag GFLAG (GFLAG=0). Thereafter, the routine proceeds to step S706.

When the determination at step S704 is negative (GFLAG=0), the routine directly proceeds to step S706.

At step S706, ECU 40 executes a process of outputting a signal for increasing the brake hydraulic pressure and increments pressure increasing time timer INCT. Thereafter, the routine proceeds to step S707.

At step S707, ECU 40 determines whether or not pressure increasing time timer INCT is greater than or equal to pressure increasing pulse time ZAW. When the determination at step S707 is affirmative (INCT≧ZAW), the routine proceeds to step S138 wherein ECU 40 executes a process of outputting a signal for holding the brake hydraulic pressure and decrements pressure-increasing time timer INCT. Thereafter, the routine proceeds to a return block to terminate the present routine and to return the main routine of FIG. 3. When the determination at step S707 is negative (INCT<ZAW), the routine directly proceeds to the return block.

When the determination at step S703 is affirmative (FDTVIB=1), ECU 40 determines that the driveline vibration has not been converged and therefore the routine directly proceeds to step S708 to prohibit the pressure increasing control and to execute the pressure holding control.

Figure 11:
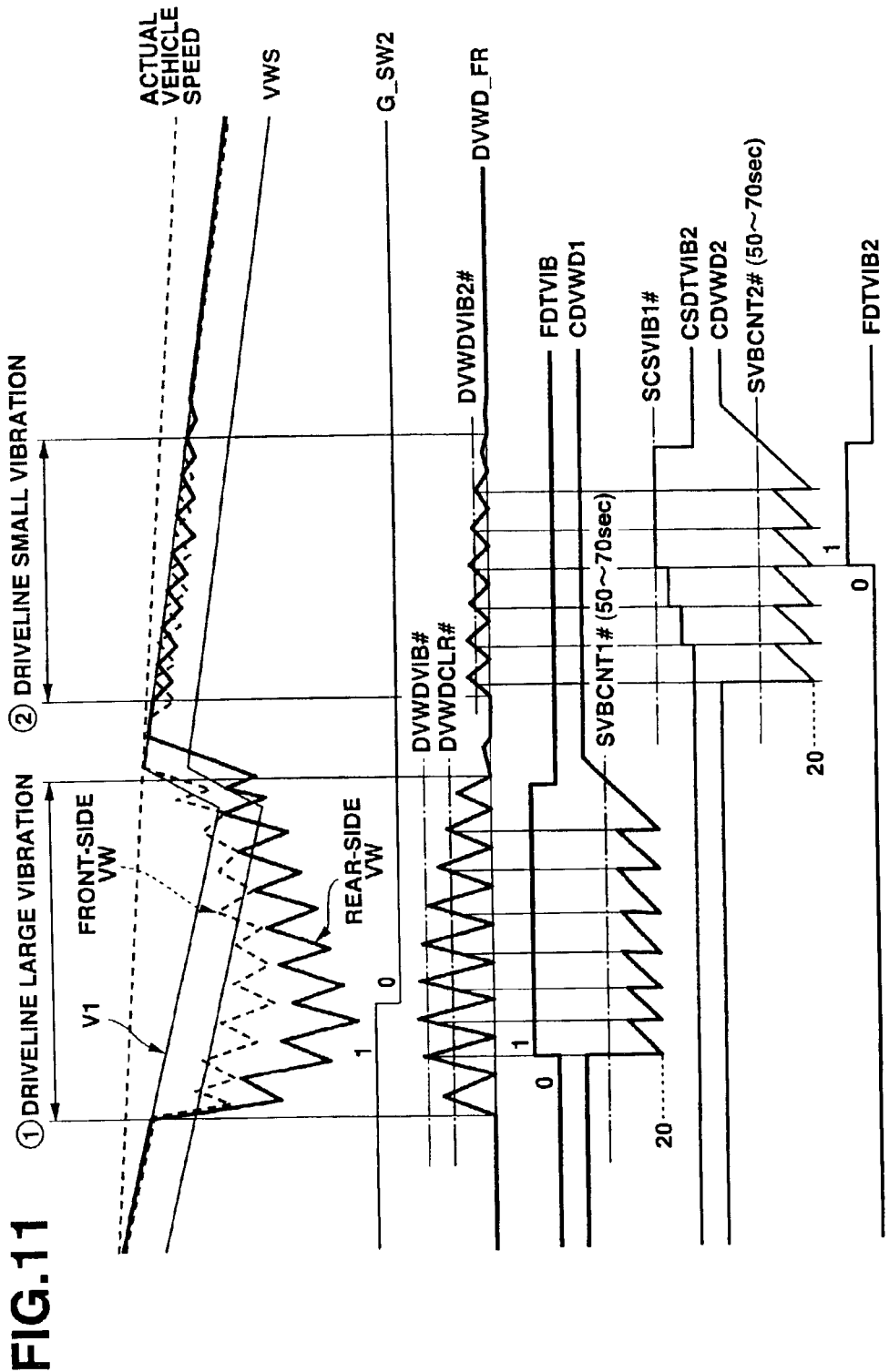
FIG. 11 is a time chart showing a control content of the driveline vibration and bad road determining process.

The manner of operation of the antiskid control system according to the present invention will be discussed on the basis of a time chart of FIG. 11.

(A) Antiskid Basic Control

The antiskid control system of the embodiment according to the present invention is arranged as discussed above. Therefore, ECU 40 executes the pressure decreasing control for decreasing the hydraulic pressure of wheel cylinder 50 by switching switch control valve 62 into the pressure decreasing control condition when the wheel speeds VW of four wheels 10, 14, 20 and 21, which speeds are detected by wheel speed sensors 12, 16, 24 and 26, become smaller than target control speed VWS obtained from pseudo-speed VI. When the vehicle is put in such a wheel speed condition, there is a tendency of causing wheel-locking. Therefore, by executing the pressure decreasing control, the braking force of the four-wheel-drive vehicle is weakened, and therefore wheel speeds VW are changed from a decelerating direction to an accelerating direction so that wheel locking of wheels is prevented.

Thereafter, when the wheel accelerations VWD become smaller than or equal to 0 g by the execution of the pressure decreasing control, the state of switch control valve 62 is changed to a pressure increasing control state to execute the pressure increasing control for increasing the hydraulic pressure of wheel cylinder 50. Therefore, the braking force of the four-wheel-drive vehicle is increased so as to prevent the shortage of deceleration of the vehicle.

(B) Driveline Vibration Determination and Driveline Vibration Convergence Control Since a four-wheel-drive vehicle has a structure that a shaft of independently controlling front wheels 10 and 14 is interconnected with a shaft for rear wheels 20 and 22 through a center differential, a torsion force is generated between the front shaft and the rear shaft. This torsion force generates a half-cycle-offset resonance of wheel speeds VW between front wheels 10 and 14 and rear wheels 20 and 22 as a driveline vibration.

The embodiment according to the present invention is arranged to calculate an absolute value of a difference between first and second averages VWDFA and VWDRA as acceleration difference DVWD_FR (=|VWDFA−VWDRA|) where the first average is an average of wheel accelerations VWDFL and VWDFR of front right and left wheels 10 and 14, and the second average is an average of wheel accelerations VWDRL and VWDRR of rear right and left wheels 20 and 22. Further, the embodiment is arranged such that when this acceleration difference DVWD_FR becomes greater than vibration determination starting threshold DVWDVIB#, ECU 40 determines that the driveline vibration is occurred and sets driveline vibration determination flag FDTVIB at 1 (FDTVIB=1), as shown by the flow of steps S305→S306→S307 in FIG. 6. Then, ECU 40 starts the control for converging the driveline vibration.

When the vehicle is traveling a bad road, the acceleration difference DVWD_FR does not become greater than vibration determination starting threshold DVWDVIB#. Therefore, under this bad-road traveling condition, ECU 40 does not regard such condition as the driveline vibration, and therefore EUC 40 does not execute the control for converging the driveline vibration under this bad-road traveling condition.

Furthermore, this driveline vibration convergence control is terminated by resetting driveline vibration determination flag FDTVIB (FDTVIB=0) at a moment when acceleration-difference absolute value DVWD_FR becomes smaller than or equal to vibration determination terminating threshold DVWDCLR# which is slightly smaller than vibration determination starting threshold DVWDVIB#. This operation corresponds to the flow of steps S309→S311→S312 in FIG. 6. Therefore, the driveline-vibration convergence control is continued for a predetermined time period until the driveline vibration is converged to a predetermined level.

Figure 9:
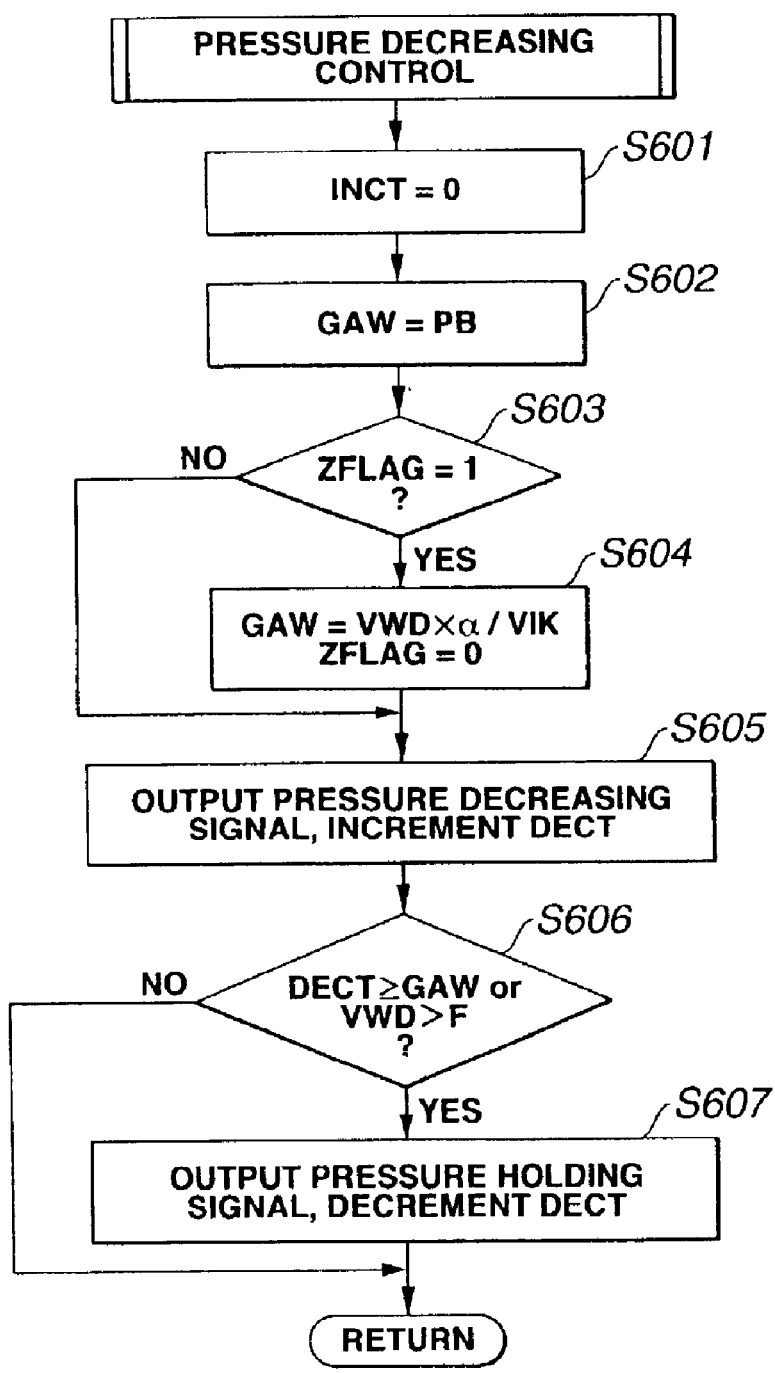
FIG. 9 is a flowchart showing a pressure increasing control process which is of a sub-routine of the flowchart of FIG. 3.

The driveline-vibration convergence control is executed as follows:

First, the pressure decreasing control is forcibly executed for a predetermined time period as shown by FIG. 9, by the execution of steps S6, S10 and S11 in FIG. 3. That is, the pressure decreasing control functioning as the driveline-vibration convergence control is terminated at a moment when vibration pressure-decreasing counter content SGENCNT becomes greater than vibration pressure decreasing count threshold #SGEN. The operation corresponds to the flow of steps S6→S10→S7 in FIG. 3.

Next, when driveline vibration determination flag FDTVIB is set at 1 (FDVIB=1), the pressure increasing control is prohibited, and the pressure holding control is executed by executing the flow of steps S6→S10→S7→S8→S13→S20→S21 in FIG. 3.

Accordingly, during the driveline-vibration convergence control, the pressure decreasing control is executed for a predetermined time, and the pressure holding control is then executed, so that the driveline vibration is converged.

(C) Bad-Road Determination and Small-Vibration Convergence Control

When acceleration-difference absolute value DVWD_FR becomes greater than small-vibration determination threshold DVWDVIB2#, ECU 40 counts the cyclic vibrations which are greater than the small-vibration determination threshold SCSVIB# by means of small-vibration counter. Further, when the count CSDTVIB2 of small-vibration cycle counter becomes greater than small-vibration determination threshold SCSVIB#, ECU 40 determines that the vehicle is traveling a bad road which generates small vibration, and sets small-vibration determination flag FDTVIB2 at 1 (FDTVIB2=1). This operation corresponds to the flow of steps S313→S314→S318→S319 in FIG. 6. The control for converging the small vibration is started thereby.

During the small-vibration convergence control, the pressure increasing control is prohibited by the execution of steps S13→S20→S21 in FIG. 3. The small-vibration convergence control is terminated at a moment when acceleration difference DVWD_FR becomes smaller than or equal to small-vibration determination threshold DVWDVIB2# by the execution of steps S320 and S321 in FIG. 6.

By prohibiting the pressure increasing control during the small-vibration convergence control, the small-vibration generated by traveling a bad road is converged.

With the thus arranged embodiment according to the present invention, it is possible to firmly detect the driveline vibration while preventing an erroneous determination during the bad-road traveling. Therefore, it is possible to execute the driveline-vibration convergence control process only when the driveline vibration occurs. This enables to prevent problems such as lacking of deceleration due to misjudge as to the driveline vibration, shortage of deceleration, and increase of braking distance. Further, thus arranged antiskid control system is capable of detecting the vibration during the bad-road traveling independent from the driveline vibration and to converge the vibration independently.

Further, since the embodiment according to the present invention is arranged such that the driveline vibration determination threshold includes vibration determination starting threshold DVWDVIB# for determining a starting point of the driveline vibration converging process, and vibration determination terminating threshold DVWDCLR# for determining a terminating point of the driveline vibration converging process, it is possible to prevent the erroneous determination of detecting the driveline vibration by setting vibration determination starting threshold DVWDVIB# at a higher level and to firmly converge the driveline vibration within a predetermined range of the driveline vibration convergence processing time by setting vibration determination terminating threshold DVWDCLR# at a lower value.

Further, the prohibiting control of the pressure increasing control may be arranged to execute the pressure holding control or the pressure decreasing control according to the relationship between target control speed VWS and wheel speed VW in addition to prohibiting the pressure increasing control.

The entire contents of Japanese Patent Application No. 2001-235402 filed on Aug. 2, 2001 in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. For example, although the embodiment according to the present invention has been shown and described to again execute the pressure increasing control when wheel acceleration VWD becomes smaller than or equal to 0 g, the re-execution of the pressure increasing control may be started when wheel acceleration becomes greater than or equal to a predetermined acceleration such as 5 g, so as to clearly form pseudo-speed VI.

Further, although the embodiment according to the present invention has been shown and described to set select-high wheel speed VFS at a maximum value of wheel speeds VW of four wheels, secondly high wheel speed VW or thirdly high wheel speed VW may be selected as select-high wheel speed VFS according to the vehicle traveling condition.

The scope of the invention is defined with reference to the following claims.

What is claimed is:

1. An antiskid control system for a four-wheel-drive vehicle, comprising:

a master cylinder generating a braking hydraulic pressure;

a braking cylinder attached to each wheel of the four-wheel-drive vehicle, the braking cylinder generating a braking force by receiving the braking hydraulic pressure;

a switch control valve disposed between the master cylinder and the braking cylinder, the switch control valve switching between a pressure decreasing control condition of decreasing the hydraulic pressure of the braking cylinder and a pressure increasing control condition of increasing the hydraulic pressure;

a wheel speed detector attached to each wheel, the wheel speed detector detecting a wheel speed of each wheel and outputting a wheel speed indicative signal; and a control unit coupled to the switch control valve and the wheel speed detector, the control unit being arranged, to calculate a target control speed on the basis of the wheel speed of each wheel, to calculate a wheel acceleration of each wheel from the wheel speed, to set the switch control valve at the pressure decreasing control condition when the wheel speed reaches the target control speed, to set the switch control valve at the pressure increasing control condition when the wheel acceleration is outside of a range from zero to a predetermined positive value after the switch control valve is set at the pressure decreasing control condition, to calculate a difference between an average of the wheel accelerations of front wheels and an average of the wheel acceleration of rear wheels, to determine that a driveline vibration is generated when the difference is greater than a vibration determination threshold, and to execute a vibration convergence control for converging the driveline vibration when the driveline vibration is generated, wherein the vibration determination threshold includes a vibration determination starting threshold for determining a starting point of the vibration convergence control and a vibration determination terminating threshold for determining a terminating point of the vibration convergence control.

2. An antiskid control system for a four-wheel-drive vehicle, comprising:

a master cylinder generating a braking hydraulic pressure:

a braking cylinder attached to each wheel of the four-wheel-drive vehicle, the braking cylinder generating a braking force by receiving the braking hydraulic pressure:

a switch control valve disposed between the master cylinder and the braking cylinder, the switch control valve switching between a pressure decreasing control condition of decreasing the hydraulic pressure of the braking cylinder and a pressure increasing control condition of increasing the hydraulic pressure:

a wheel speed detector attached to each wheel, the wheel speed detector detecting a wheel speed of each wheel and outputting a wheel speed indicative signal; and a control unit coupled to the switch control valve and the wheel speed detector, the control unit being arranged, to calculate a target control speed on the basis of the wheel speed of each wheel, to calculate a wheel acceleration of each wheel from the wheel speed, to set the switch control valve at the pressure decreasing control condition when the wheel speed reaches the target control speed, to set the switch control valve at the pressure increasing control condition when the wheel acceleration is outside of a range from zero to a predetermined positive value after the switch control valve is set at the pressure decreasing control condition, to calculate a difference between an average of the wheel accelerations of front wheels and an average of the wheel acceleration of rear wheels, to determine that a driveline vibration is generated when the difference is greater than a vibration determination threshold, and to execute a vibration convergence control for converging the driveline vibration when the driveline vibration is generated, wherein the vibration convergence control includes a process for executing the pressure decreasing control for a predetermined time period and a process for prohibiting the pressure increasing control for a predetermined time period after the execution of the pressure decreasing control and for executing a pressure holding control.

3. An antiskid brake control system for a four-wheel-drive vehicle, comprising:

a master cylinder generating a braking hydraulic pressure;

a braking cylinder attached to each wheel of the four-wheel-drive vehicle, the braking cylinder generating a braking force by receiving the braking hydraulic pressure;

a switch control valve disposed between the master cylinder and the braking cylinder, the switch control valve switching between a pressure decreasing control condition of decreasing the hydraulic pressure of the braking cylinder and a pressure increasing control condition of increasing the hydraulic pressure;

a wheel speed detector attached to each wheel, the wheel speed detector detecting a wheel speed of each wheel and outputting a wheel speed indicative signal; and a control unit coupled to the switch control valve and the wheel speed detector, the control unit being arranged, to calculate a target control speed on the basis of the wheel speed of each wheel, to calculate a wheel acceleration of each wheel from the wheel speed, to set the switch control valve at the pressure decreasing control condition when the wheel speed reaches the target control speed, to set the switch control valve at the pressure increasing control condition when the wheel acceleration is outside of a range from zero to a predetermined positive value after the switch control valve is set at the pressure decreasing control condition, to calculate a difference between an average of the wheel accelerations of front wheels and an average of the wheel acceleration of rear wheels, to determine that a driveline vibration is generated when the difference is greater than a vibration determination threshold, and to execute a vibration convergence control for converging the driveline vibration when the driveline vibration is generated, wherein the control unit is further arranged to determine that a small vibration is generated when the difference is greater than the small vibration determination threshold, and to execute a small vibration convergence control for converging the small vibration when the small vibration is generated.

4. The antiskid control system as claimed in claim 3, wherein the small vibration convergence control includes a process for prohibiting the pressure increasing control for a predetermined time period.

5. The antiskid control system as claimed in claim 3, wherein the control unit is further arranged to detect the generating condition of the small vibration when the number of times that the difference becomes greater than or equal to the predetermined small vibration determination threshold is continuously counted up to a predetermined number of times.

6. The antiskid control system as claimed in claim 3, wherein the small vibration includes a vibration generated when the vehicle travels a bad road.

7. An antiskid control system for a four-wheel-drive vehicle, comprising:

a master cylinder generating a braking hydraulic pressure;

a braking cylinder attached to each wheel of the four-wheel-drive vehicle, the braking cylinder generating a braking force by receiving the braking hydraulic pressure;

a switch control device switching between a pressure decreasing control condition for decreasing the hydraulic pressure of the braking cylinder and a pressure increasing control condition for increasing the hydraulic pressure;

a wheel speed detecting means for detecting a wheel speed of each wheel;

a pseudo-speed calculating means for calculating a pseudo-speed on the basis of the wheel speed of each wheel;

a target control speed calculating means for calculating a target control speed from the pseudo-speed upon taking account of a slipping of the wheel;

a wheel acceleration calculating means for calculating an acceleration of each wheel from the wheel speed;

a brake hydraulic pressure control means for controlling the switch control device at the pressure decreasing control condition when the wheel speed reaches the target control speed, the brake hydraulic pressure control means controlling the switch control device at the pressure increasing control condition when the wheel acceleration is outside of a range from zero to a predetermined positive value after the execution of the pressure decreasing control;

a difference calculating means for calculating an acceleration difference between an average of the wheel accelerations of front wheels and an average of the wheel acceleration of rear wheels;

a driveline vibration detecting means for detecting the generation of a driveline vibration by comparing the acceleration difference with a vibration determination threshold; and a vibration convergence controlling means for executing a driveline vibration convergence control when the driveline vibration is generating, wherein the driveline vibration is executed by the vibration convergence controlling means only when the acceleration difference is greater than the vibration determination threshold, and wherein the driveline vibration is halted by the vibration convergence controlling means when the acceleration difference becomes less than a vibration termination threshold and the vibration termination threshold is slightly less than the vibration determination threshold.

8. An antiskid control system for a four-wheel-drive vehicle, the antiskid control system executing an antiskid control of each wheel of the vehicle by controlling a switch control valve disposed between a master cylinder and a wheel cylinder of each wheel of the vehicle, the antiskid control system comprising:

a control unit programmed to detect a wheel speed of each wheel, to calculate a target control speed on the basis of the wheel speed of each wheel, to calculate a wheel acceleration of each wheel from the wheel speed, to command the switch control valve to execute a pressure decreasing control of decreasing a hydraulic pressure of the wheel cylinder when the wheel speed reaches the target control speed, to command the switch control valve to execute a pressure increasing control of increasing the hydraulic pressure of the wheel cylinder when the wheel acceleration is smaller than zero or greater than a predetermined positive value after the pressure decreasing control is executed, to calculate an acceleration difference between an average of the wheel accelerations of front wheels and an average of the wheel acceleration of rear wheels, to determine that a driveline vibration is generated when the acceleration difference is greater than or equal to the vibration determination threshold, and to execute a control for converging the driveline vibration when the driveline vibration is generated, wherein the driveline vibration converging operation is executed only when the acceleration difference is greater than the vibration determination threshold, and wherein the control unit is further programmed to halt the vibration convergence control when the acceleration difference becomes less than a vibration termination threshold and the vibration termination threshold is slightly less than the vibration determination threshold.

* * * * *